(12) United States Patent
Tomiyama et al.

(10) Patent No.: US 10,981,508 B2
(45) Date of Patent: Apr. 20, 2021

(54) VEHICLE DOOR MIRROR

(71) Applicant: KABUSHIKI KAISHA HONDA LOCK, Miyazaki (JP)

(72) Inventors: Junichi Tomiyama, Miyazaki (JP); Koichi Izaki, Miyazaki (JP); Tetsuya Oda, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 58 days.

(21) Appl. No.: 16/438,985

(22) Filed: Jun. 12, 2019

(65) Prior Publication Data
US 2019/0389384 A1   Dec. 26, 2019

(30) Foreign Application Priority Data

Jun. 22, 2018   (JP) .............................. JP2018-118811

(51) Int. Cl.
*B60J 5/04* (2006.01)
*B60R 1/068* (2006.01)

(52) U.S. Cl.
CPC ............ *B60R 1/068* (2013.01); *B60J 5/0404* (2013.01)

(58) Field of Classification Search
CPC ......... B60R 1/068; B60R 1/074; B60R 1/066; B60R 1/072; B60R 16/0215; B60R 1/06; B60J 5/0404
See application file for complete search history.

(56) References Cited

U.S. PATENT DOCUMENTS

| | | | |
|---|---|---|---|
| 6,132,050 A * | 10/2000 | Sakata | ...................... B60R 1/07 248/478 |
| 6,412,964 B2 | 7/2002 | Hattori et al. | |
| 2001/0030819 A1* | 10/2001 | Hattori | ...................... B60R 1/06 359/879 |

FOREIGN PATENT DOCUMENTS

JP   3771773 B2   4/2006

* cited by examiner

*Primary Examiner* — Wen Huang
*Assistant Examiner* — Matthew Y Lee
(74) *Attorney, Agent, or Firm* — Carrier Blackman & Associates, P.C.; William D. Blackman; Joseph P. Carrier

(57) ABSTRACT

A vehicle door mirror includes a mirror housing accommodating an electrical component therein, a base member made from a resin, and a shaft having a cord through hole through which a cord that is to be connected to the electrical component is inserted, the shaft being standingly provided on the base member so as to pivotably support a base end portion of the mirror housing. The base member has a slit formed therein. The slit has an outer end opening on a side edge of the base member so that the cord guided out from the cord through hole toward the base member side can be inserted through the slit. A linking part that links paired mutually opposing side faces of the slit together via an inner end part of the slit is formed on the base member so as to have a shape protruding downward.

4 Claims, 6 Drawing Sheets

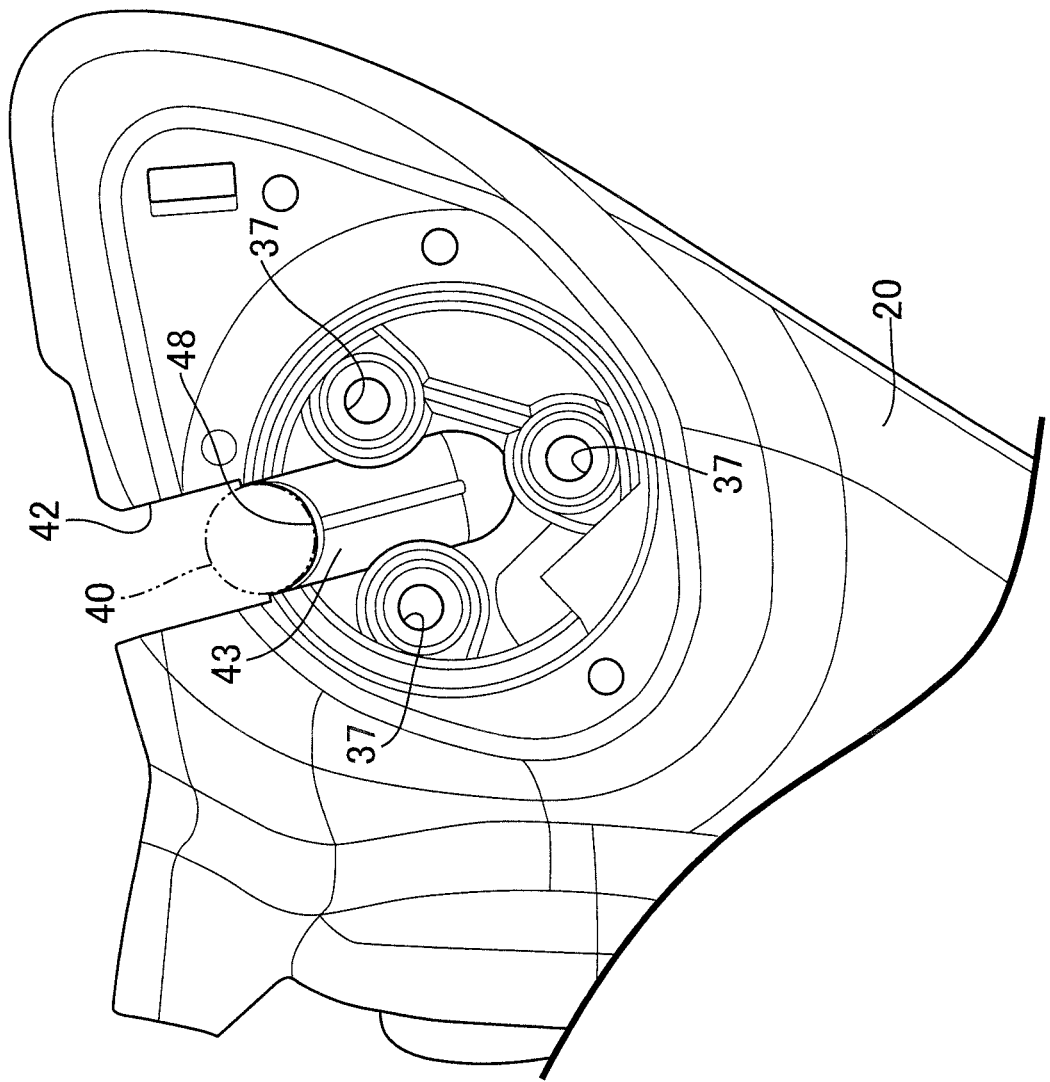

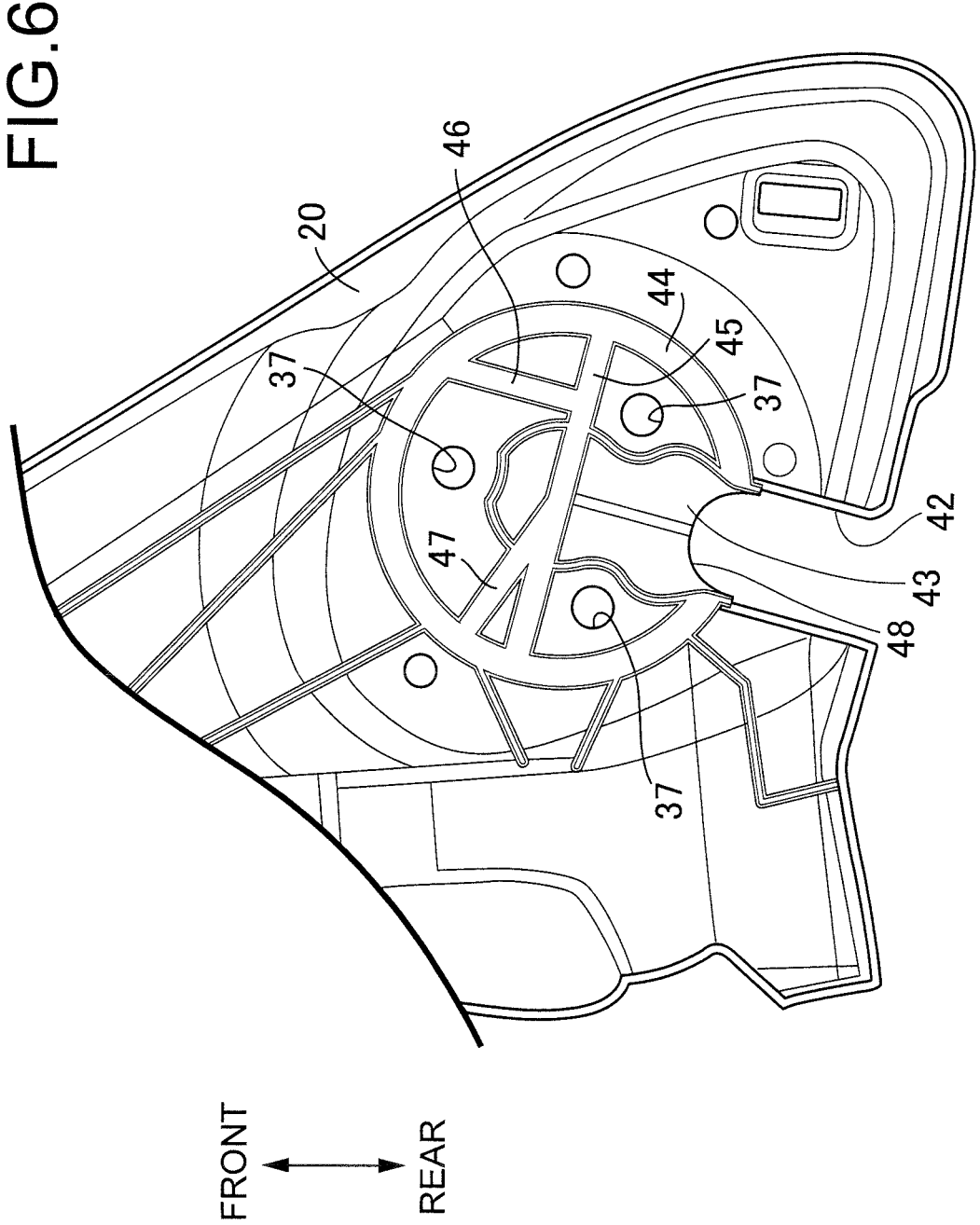

VEHICLE DOOR MIRROR

BACKGROUND OF THE INVENTION

Field of the Invention

The present invention relates to a vehicle door mirror comprising a mirror housing that has a mirror housing recess housing a mirror and in which an electrical component is housed, a base member that is made from a resin and mounted on a side door, and a shaft that has a cord through hole through which a cord that is to be connected to the electrical component is inserted and that is standingly provided on the base member so as to pivotably support a base end portion of the mirror housing, the base member having a slit formed therein and the slit having an outer end opening on a side edge of the base member so that the cord guided out from the cord through hole toward the base member side is inserted through the slit.

Description of the Related Art

Japanese Patent No. 3771773 has made known a vehicle door mirror in which a slit for inserting a cord is formed in a base member since, if a circular cord insertion hole for inserting a cord is formed in the base member, the operation of inserting a cord into the cord insertion hole is complicated.

However, when the base member is made of a resin, in the structure disclosed in Japanese Patent No. 3771773 the stiffness of the base member is degraded due to a slit being formed in the base member, and not only is there a possibility that the strength toward an external force will be weakened, but there is also a possibility that deformation such as twisting will occur in the base member at the time of molding due to the slit being present.

SUMMARY OF THE INVENTION

The present invention has been accomplished in light of such circumstances, and it is an object thereof to provide a vehicle door mirror that can maintain its strength by ensuring the stiffness for a base member even with the presence of a slit and that can also suppress deformation at the time of molding.

In order to achieve the object, according to a first aspect of the present invention, there is provided a vehicle door mirror comprising a mirror housing that has a mirror housing recess housing a mirror and in which an electrical component is housed, a base member that is made from a resin and mounted on a side door, and a shaft that has a cord through hole through which a cord that is to be connected to the electrical component is inserted and that is standingly provided on the base member so as to pivotably support a base end portion of the mirror housing, the base member having a slit formed therein and the slit having an outer end opening on a side edge of the base member so that the cord guided out from the cord through hole toward the base member side is inserted through the slit, wherein a linking part that links a pair of mutually opposing side faces of the slit to each other via an inner end part of the slit is formed on the base member so as to have a shape that protrudes downward.

In accordance with the first aspect of the present invention, since the linking part providing a link between the pair of side faces of the slit via the inner end part of the slit is formed on the base member so as to have a shape projecting downward, it is possible to prevent the strength from being degraded by ensuring the stiffness for the base member, which is made of a resin, despite the base member having the slit, and also to suppress deformation of the base member at the time of molding.

According to a second aspect of the present invention, in addition to the first aspect, a restricting projection portion is projectingly provided on a lower end part of the shaft at one position in a peripheral direction, the cord being sandwiched between the restricting projection portion and the linking part.

In accordance with the second aspect of the present invention, since the cord will not rise up through the slit due to the restricting projection part being provided on the shaft, it is possible to prevent the cord from being damaged or cut by ensuring that the cord will not be sandwiched between the base member and the mirror housing when the mirror housing is pivoting.

The above and other objects, characteristics and advantages of the present invention will be clear from detailed descriptions of the preferred embodiment which will be provided below while referring to the attached drawings.

BRIEF DESCRIPTION OF THE DRAWINGS

FIG. 5 is a plan view showing part of the base member.

FIG. 6 is a bottom view showing part of the base member.

DESCRIPTION OF THE PREFERRED EMBODIMENT

Figure 1:
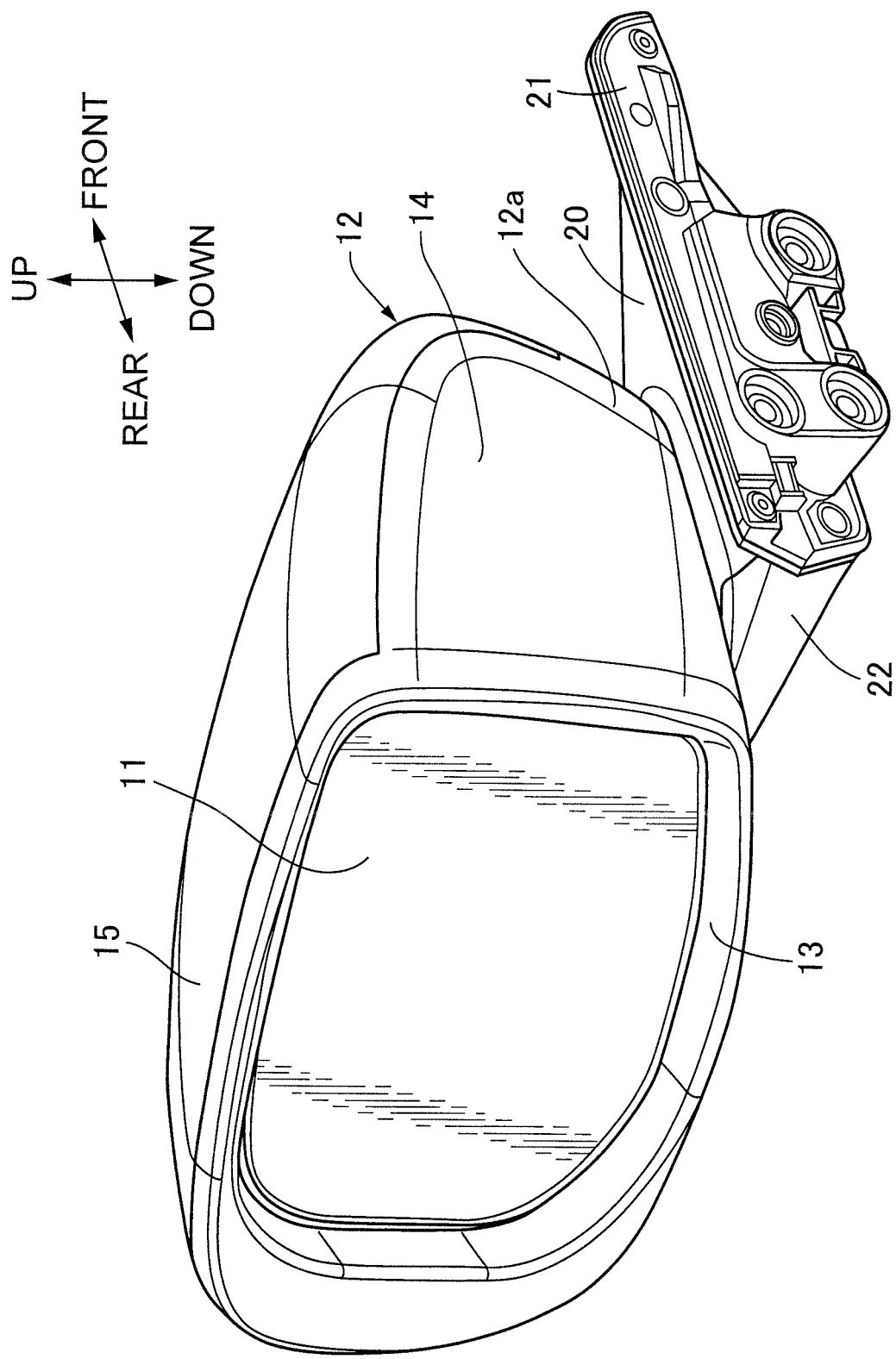
FIG. 1 is a perspective view when a vehicle door mirror is viewed obliquely from the rear.
Figure 2:
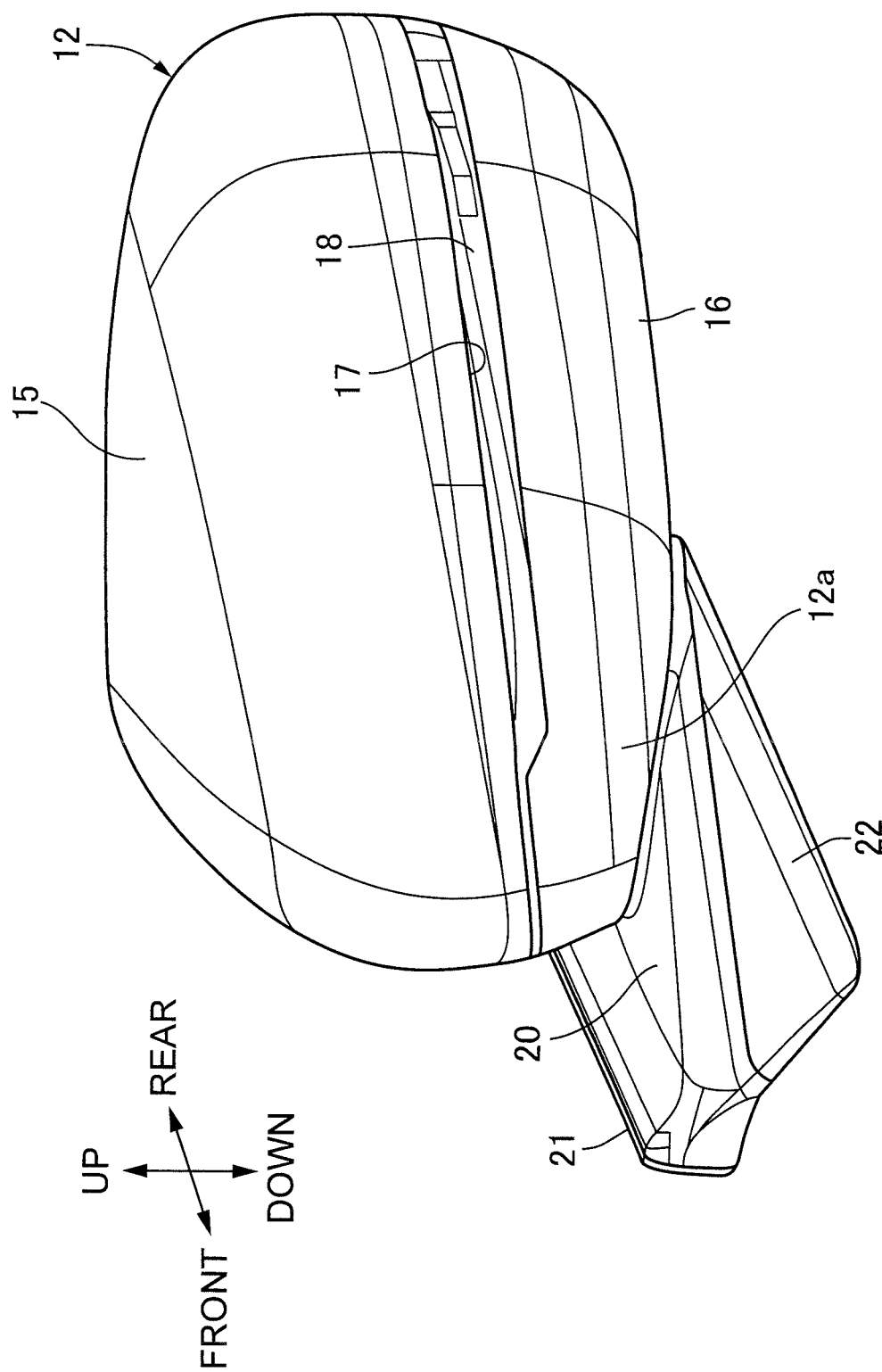
FIG. 2 is a perspective view when the vehicle door mirror is viewed obliquely from the front.

An embodiment of the present invention is explained below by reference to the attached FIG. 1 to FIG. 6; first, in FIG. 1 and FIG. 2, left and right front side doors in a passenger vehicle are provided with a mirror housing 12 into which a mirror 11 for viewing to the rear of the vehicle is fitted so that the mirror housing 12 can pivot between a raised position in which it projects sideways from the front side door and a retracted position in which it is retracted toward the front side door.

The mirror housing 12 is formed from a housing main body 14, made of a resin, having a mirror housing recess 13 housing the mirror 11, an upper cover 15, made of a resin, covering the housing main body 14 from a direction opposite to the mirror 11, and a lower cover 16, made of a resin, covering a lower part of the housing main body 14 from below; a side turn lamp 18 as an electrical component is housed within the mirror housing 12, part of the side turn lamp 18 facing a slit 17 for the lamp formed between the upper cover 15 and the lower cover 16.

The mirror 11 is retained by a mirror holder, which is not illustrated, and the mirror 11 retained by the mirror holder is disposed in an opening of the housing main body 14, that is, an open end part of the mirror housing recess 13.

Figure 3:
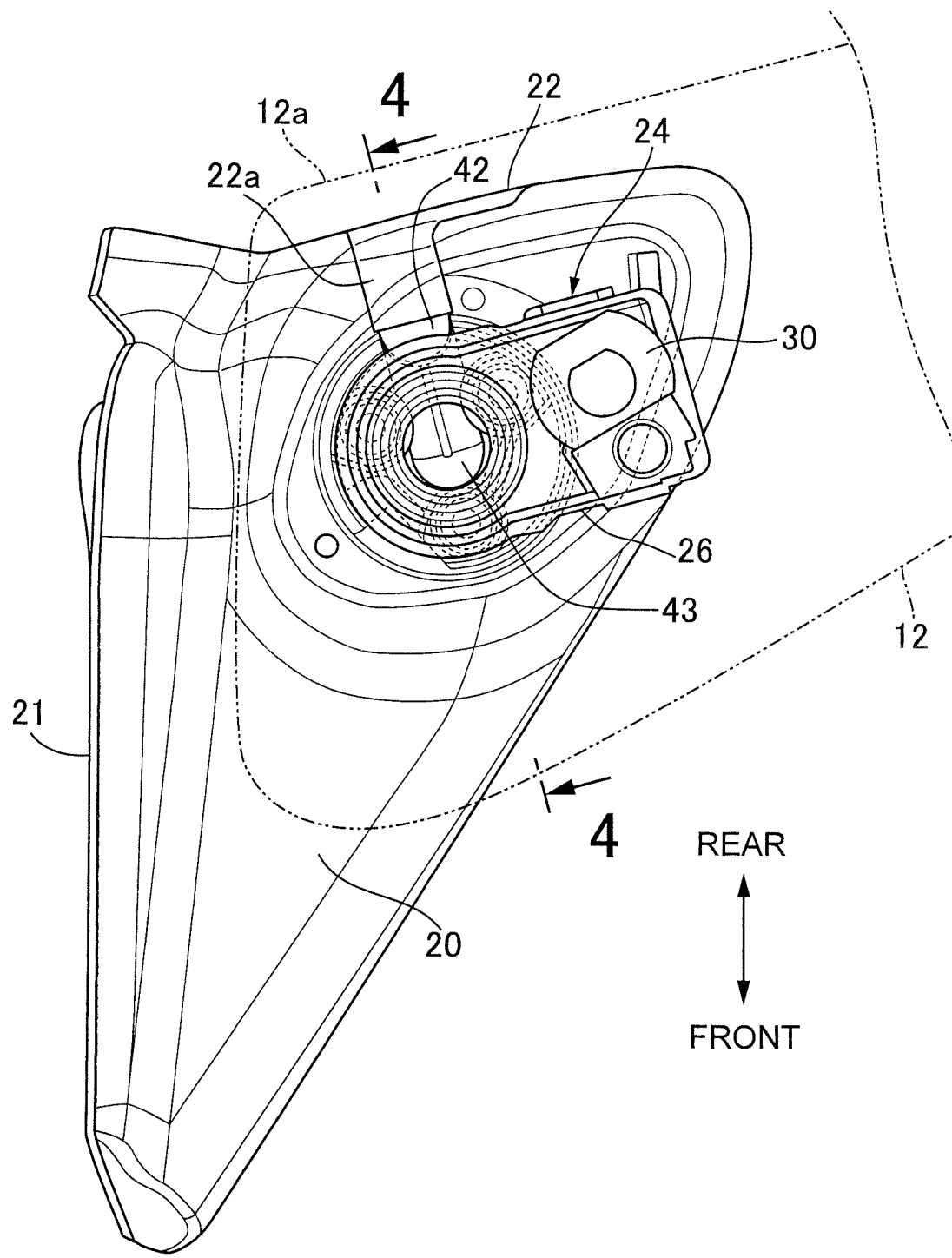
FIG. 3 is a plan view of a base member and an electric retraction unit with a mirror housing omitted.
Figure 4:
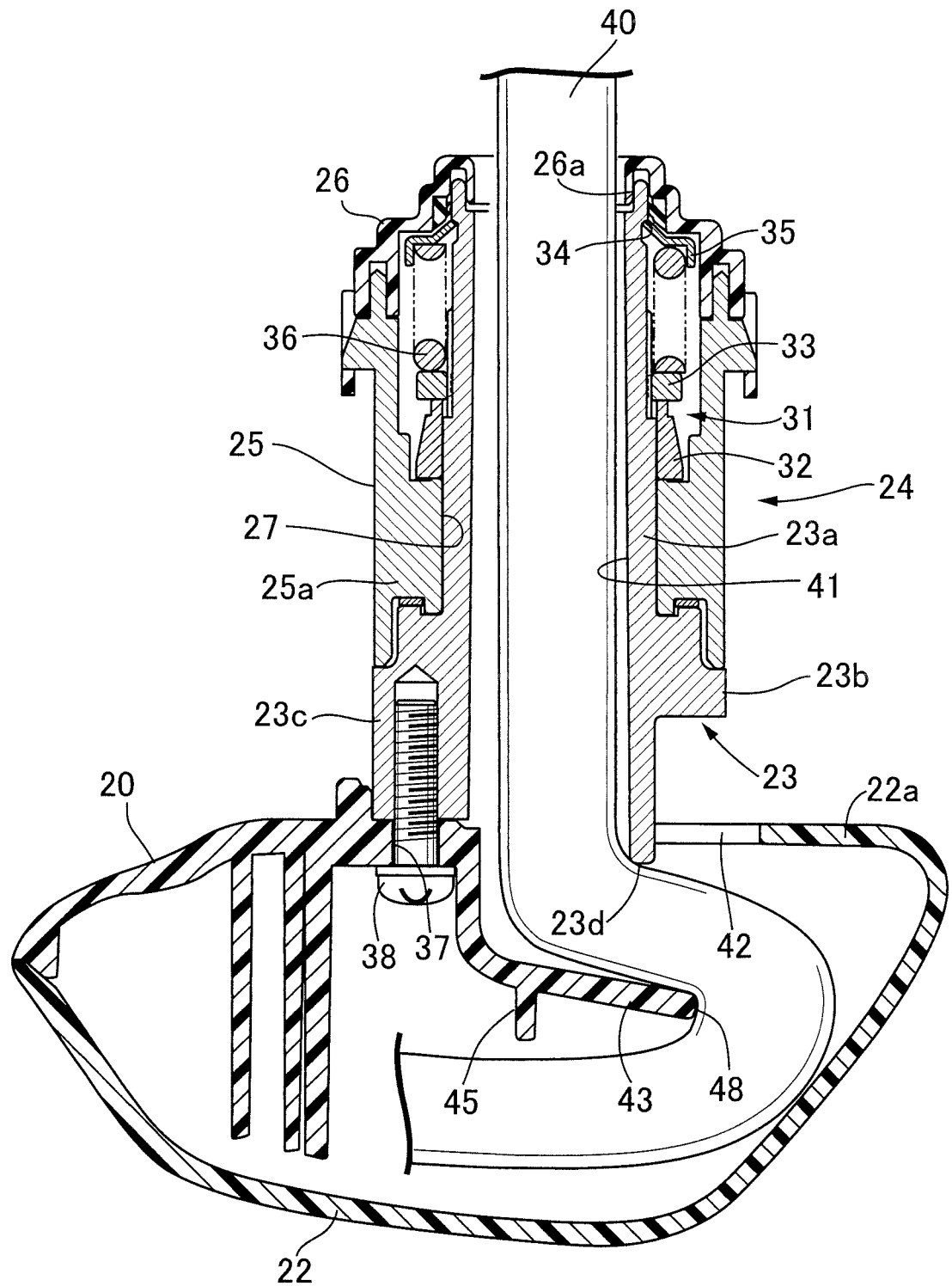
FIG. 4 is a sectional view along line 4-4 in FIG. 3.

Referring in addition to FIG. 3 and FIG. 4, a base member 20 made of a resin is mounted on the front side door so that a seat base 21 made of a resin is disposed between the base member 20 and the front side door, and the mirror housing 12 is pivotably supported on a shaft 23 standingly provided on the base member 20 at a position spaced outward from the front side door. A base cover 22, made of a resin, covering the base member 20 from below is detachably mounted on the base member 20.

An electric retraction unit 24 is housed within a base end portion 12a of the mirror housing 12, the electric retraction unit 24 is pivotably supported by the shaft 23, which is standingly provided on the base member 20 and penetrates into the interior of the base end portion 12a of the mirror housing 12, and the housing main body 14 of the mirror housing 12 is mounted on the electric retraction unit 24. That is, the base end portion 12a of the housing main body 14 is pivotably supported via the electric retraction unit 24 on the shaft 23 standingly provided on the base member 20 mounted on the front side door, and the mirror housing 12 is configured to be selectively pivoted by operation of the electric retraction unit 24 between the raised position, in which it projects sideways from the front side door, and the retracted position, in which it is retracted toward the front side door.

The shaft 23 integrally has a cylindrical portion 23a that extends in the up-down direction, a collar portion 23b that protrudes sideways from a lower part of the cylindrical portion 23a, and a cylindrical mounting boss portion 23c that projects downward from the collar portion 23b so as to be connected to the lower part of the cylindrical portion 23a and the collar portion 23b at three positions equally spaced in the peripheral direction of the cylindrical portion 23a.

The electric retraction unit 24 includes a gear case 25 pivotably supported on the cylindrical portion 23a of the shaft 23, and a cover 26 joined to the gear case 25 so as to cover the gear case 25 from above.

The housing main body 14 of the mirror housing 12 is fastened to the gear case 25. Formed on a lower part of the gear case 25 is a first bearing portion 25a having a support hole 27 through which the cylindrical portion 23a of the shaft 23 extends, the first bearing portion 25a being pivotably supported by the cylindrical portion 23a, and the gear case 25 being thrust-supported by the collar portion 23b of the shaft 23. A cylindrical second bearing portion 26a is formed integrally with the cover 26, the second bearing portion 26a being fitted onto an upper end part of the cylindrical portion 23a of the shaft 23 so that it is pivotably supported by the upper end part of the cylindrical portion 23a.

The electric retraction unit 24 includes an electric motor 30 as an electrical component that exerts power for pivoting the mirror housing 12 around the axis of the cylindrical portion 23a of the shaft 23 between the retracted position and the raised position, and a drive mechanism 31 provided between the electric motor 30 and the cylindrical portion 23a so as to pivot the mirror housing 12 around the axis of the cylindrical portion 23a in response to operation of the electric motor 30. The electric motor 30 is mounted on the gear case 25, the cover 26 is joined to the gear case 25 so as to cover the electric motor 30, and the drive mechanism 31 is housed between the gear case 25 and the cover 26.

A clutch gear 32, which is part of the drive mechanism 31, is rotatably fitted around the cylindrical portion 23a of the shaft 23 while abutting against the first bearing portion 25a, and a clutch plate 33 sandwiching the clutch gear 32 between itself and the first bearing portion 25a is non-rotatably and axially movably fitted around the cylindrical portion 23a. A coil-shaped clutch spring 36 is provided in a compressed state between the clutch plate 33 and a retainer 35 that is received by an annular latching step part 34 formed on the outer periphery of the cylindrical portion 23a of the shaft 23 at a position close to the second bearing portion 26a.

In a state in which no external force with a predetermined value or greater is acting on the mirror housing 12, the clutch gear 32 is sandwiched between the first bearing portion 25a and the clutch plate 33 to thus be prevented from rotating around the axis of the cylindrical portion 23a, and when in this state the electric motor 30 operates, the electric retraction unit 24, that is, the mirror housing 12, pivots around the axis of the cylindrical portion 23a between the retracted position, in which it is retracted toward the front side door, and the raised position, in which it projects sideways from the front side door.

On the other hand, when a predetermined value or greater of external force acts on the mirror housing 12, the clutch gear 32 can pivot around the axis of the cylindrical portion 23a between a rearward tilted position and a forward tilted position while slipping between the first bearing portion 25a and the clutch plate 33, thus enabling the mirror housing 12 to be manually pivoted or the mirror housing 12 to be pivoted by collision or contact with another obstacle.

A screw member 38 inserted from below through a through hole 37 formed in the base member 20 is screwed into the mounting boss portion 23c of the shaft 23, and tightening the screw member 38 fixes the shaft 23 to the base member 20 so that the shaft 23 rises upward from the base member 20.

The electric motor 30, the side turn lamp 18, and an electric actuator that pivots the mirror holder retaining the mirror 11 in the left-right and up-down directions are housed within the mirror housing 12 as electrical components, and a cord 40 connected to these electrical components is guided out from a cord through hole 41, formed within the cylindrical portion 23a of the shaft 23, toward the base member 20 side. Furthermore, the cord 40 extends from between the base member 20 and the base cover 22, through the seat base 21, and to the interior of the front side door, and a slit 42 is formed in the base member 20, the slit 42 having its outer end opening at a side edge of the base member 20 (in this embodiment a side edge facing rearward) so that the cord 40 can be inserted through the slit 42.

Moreover, the base cover 22 is integrally provided with a lid portion 22a that blocks an opening at the outer end of the slit 42 when the base cover 22, which is made of a synthetic resin and covers the base member 20 from below, is mounted on the base member 20.

Referring in addition to FIG. 5 and FIG. 6, in accordance with the present invention, a linking part 43 is formed integrally with the base member 20, the linking part 43 having a shape projecting downward and providing a link between a pair of mutually opposing side faces of the slit 42 via an inner end part of the slit 42, and in this embodiment the linking part 43 is formed into a curved shape that protrudes downward and bulges to define a structure that receives part of the cord 40 therein and that supports the cord 40 from below, as shown.

Furthermore, provided integrally with a lower face of the base member 20 so as to project downward are an arc-shaped first rib 44 following an imaginary circle with as a center the center position of three of the through holes 37, a second rib 45 extending in the vehicle width direction and having opposite ends connected to the first rib 44, a third rib 46 extending in the fore-and-aft direction and providing a connection between the first rib 44 and the second rib 45, and a fourth rib 47 that is inclined so as to be positioned forward in going inward in the vehicle width direction and providing a connection between the first rib 44 and the second rib 45.

The linking part 43 is formed integrally with the base member 20 so that a forward end part is disposed between opposite ends in the peripheral direction of the first rib 44, which is arc-shaped. A recess 48 recessed in an arc shape is formed in a rear end part of the linking part 43 so as to follow part of the outer periphery of the cord 40, and the second rib 45 is formed on the base member 20 so as to intersect the linking part 43.

Furthermore, at one position in the peripheral direction of the lower end part of the shaft 23, in this embodiment one position in the peripheral direction of the lower end part of the cylindrical portion 23a of the shaft 23, a restricting projection portion 23d sandwiching the cord 40 between itself and the linking part 43 is projectingly and integrally formed so as to project further downward than the lower end of the mounting boss portion 23c.

The operation of this embodiment is now explained; the slit 42 is formed in the base member 20 so that its outer end opens on the side edge of the base member 21, the cord 40 guided out from the cord through hole 41 of the shaft 23 toward the base member 20 side being capable of being inserted through the slit 42. Since the linking part 43, which provides a link between the pair of mutually opposing side faces of the slit 42 via the inner end part of the slit 42, is formed on the base member 20 so as to have a shape projecting downward, it is possible to prevent the strength from being degraded by ensuring the stiffness for the base member 20, which is made of a resin, despite the base member 20 having the slit 42, and also to suppress deformation of the base member 20 at the time of molding.

Moreover, since the restricting projection portion 23d sandwiching the cord 40 between itself and the linking part 43 is projectingly provided at one position in the peripheral direction of the lower end part of the shaft 23, the cord 40 will not rise up through the slit 42, and it is possible to prevent the cord 40 from being damaged or cut by ensuring that the cord 40 will not be sandwiched between the base member 20 and the mirror housing 12 when the mirror housing 12 is pivoting.

An embodiment of the present invention is explained above, but the present invention is not limited to the above-mentioned embodiment and may be modified in a variety of ways as long as the modifications do not depart from the gist of the present invention.

What is claimed is:
1. A vehicle door mirror comprising
   a mirror housing that has a mirror housing recess housing a mirror and in which an electrical component is housed,
   a base member that is made from a resin material and configured to be mounted on a side door, and
   a shaft that has a cord through hole formed therein, through which a cord that is to be connected to the electrical component is inserted, and that is standingly provided on the base member so as to pivotably support a base end portion of the mirror housing,
   the base member having a slit formed therein and the slit having an outer end opening on a side edge of the base member so that the cord, guided out from the cord through hole toward a base member side of the shaft, is inserted through the slit,
   wherein a linking part, that links a pair of mutually opposing side faces of the slit to each other via an inner end part of the slit, is integrally formed on the base member out of said resin material and configured so as to have a shape that protrudes downward below the side faces of the slit.

2. The vehicle door mirror according to claim 1, wherein the shaft comprises a restricting projection portion which is projectingly provided on a lower end part thereof at one position in a peripheral direction, the cord being sandwiched between a lower end of the restricting projection portion and an upper surface of the linking part.

3. The vehicle door mirror according to claim 1, wherein the linking part is configured to define a structure that supportively receives part of the cord therein.

4. The vehicle door mirror according to claim 2, wherein the restricting projection portion of the shaft extends downwardly into the base member and is disposed below all other parts of the shaft.

* * * * *